(12) United States Patent
Ungaro et al.

(10) Patent No.: US 7,930,930 B2
(45) Date of Patent: Apr. 26, 2011

(54) METHOD FOR MEASURING THE INSTANTANEOUS FLOW OF AN INJECTOR FOR GASEOUS FUELS

(75) Inventors: Carmine Ungaro, Ischia (IT); Tommaso Buono, Terni (IT)

(73) Assignee: AEA S.r.l., Rosora (IT)

( * ) Notice: Subject to any disclaimer, the term of this patent is extended or adjusted under 35 U.S.C. 154(b) by 0 days.

(21) Appl. No.: 12/626,709

(22) Filed: Nov. 27, 2009

(65) Prior Publication Data

US 2010/0126261 A1 May 27, 2010

(30) Foreign Application Priority Data

Nov. 27, 2008 (IT) .............................. B02008A0712

(51) Int. Cl.
*G01M 15/00* (2006.01)
(52) U.S. Cl. .................................. 73/114.48; 73/114.51
(58) Field of Classification Search ............... 73/114.48, 73/114.51
See application file for complete search history.

(56) References Cited

U.S. PATENT DOCUMENTS

| | | | |
|---|---|---|---|
| 4,750,352 A | 6/1988 | Kolhoff | |
| 5,801,308 A * | 9/1998 | Hara | 73/223 |
| 6,755,076 B1 | 6/2004 | Schmidt et al. | |
| 6,915,683 B2 * | 7/2005 | Schoeffel et al. | 73/114.48 |
| 7,171,847 B2 * | 2/2007 | Kuhn | 73/114.48 |
| 7,197,918 B2 * | 4/2007 | Shen | 73/114.51 |
| 7,587,931 B2 * | 9/2009 | Krassinger et al. | 73/114.42 |
| 2003/0177823 A1 | 9/2003 | Schoeffel et al. | |

FOREIGN PATENT DOCUMENTS

EP  1746394  1/2007

OTHER PUBLICATIONS

Ungaro, C. et al., Nuovo Sistema Di Misura Della Portate Istantanea Degli Intiettori, ATA—Ingegneria Dell 'Autoveicolo, vol. 61, No. 5/6, May 30, 2008, pp. 38-42.

* cited by examiner

*Primary Examiner* — Freddie Kirkland, III
(74) *Attorney, Agent, or Firm* — Lieberman & Brandsdorfer, LLC

(57) ABSTRACT

The instantaneous flow of an injector for gaseous fuels is calculated by measuring the pressure and temperature of a test gas injected inside a measuring chamber connected to the external environment in a continuous manner through a given outlet section and using a calculation formula, in which the instantaneous flow of the injector is a function of on the measured pressure, of a first factor as a function of a volume of the measuring chamber and the measured temperature, and of a second factor as a function of the measured temperature and the outlet section.

14 Claims, 3 Drawing Sheets

METHOD FOR MEASURING THE INSTANTANEOUS FLOW OF AN INJECTOR FOR GASEOUS FUELS

The present invention relates to a method for measuring the instantaneous flow of an injector for gaseous fuels.

BACKGROUND OF THE INVENTION

In the field of measuring the instantaneous flow of an injector for gaseous fuels, it is known to provide a measuring instrument of the type comprising a measuring chamber connected to the injector and further connected to the external environment in a continuous manner through an outlet having a given outlet section; a pressure sensor and a temperature sensor for measuring pressure and temperature of a test gas within the measuring chamber during at least one injection cycle of the injector; and a calculation device for calculating the instantaneous flow of the injector as a function of the measured pressure and temperature values.

The known measuring instruments of the above-described type have some drawbacks, mainly deriving from that the methods of calculating the instantaneous flow in these measuring instruments are relatively inaccurate and complex.

SUMMARY OF THE INVENTION

It is an object of the present invention to provide a method for measuring the instantaneous flow of an injector for gaseous fuels which is free from the above-described drawbacks and which is simple and cost-effective to be implemented.

According to the present invention, there is provided a method for measuring the instantaneous flow of an injector for gaseous fuels as claimed in the attached claims.

BRIEF DESCRIPTION OF THE DRAWINGS

The present invention will now be described with reference to the accompanying drawings, which illustrate a non-limitative embodiment thereof, in which.

DETAILED DESCRIPTION OF THE INVENTION

Figure 1:
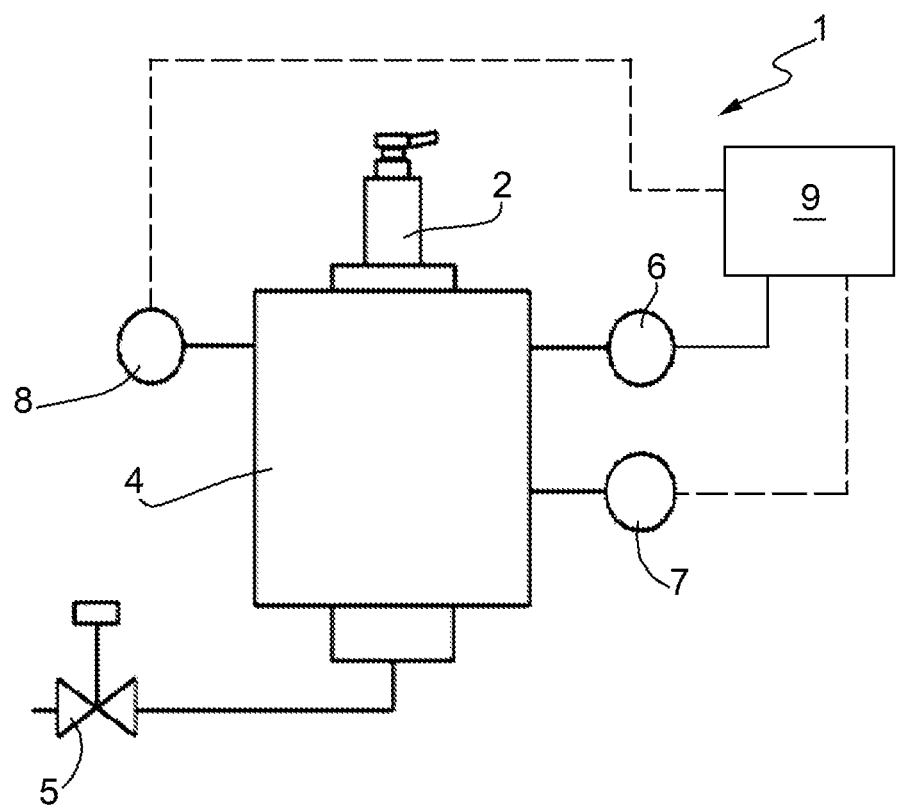
FIG. 1 is a schematic view of a preferred embodiment of the measuring instrument of the present invention.
Figure 2:
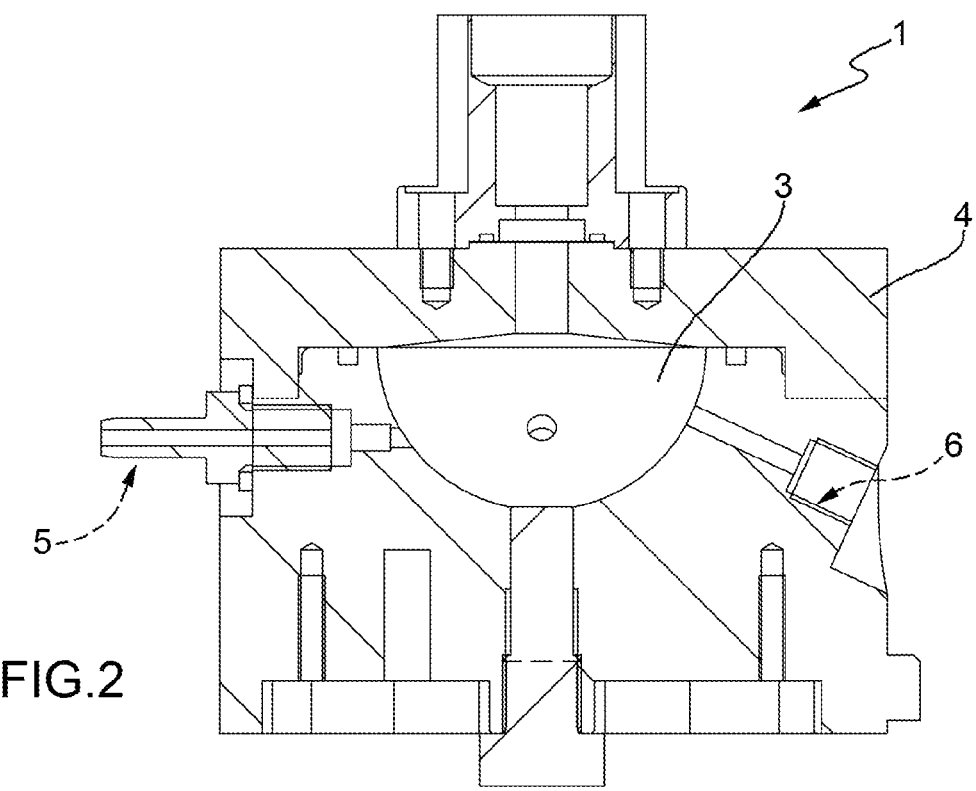
FIG. 2 is a first section of a first detail of the measuring instrument in FIG. 1.
Figure 3:
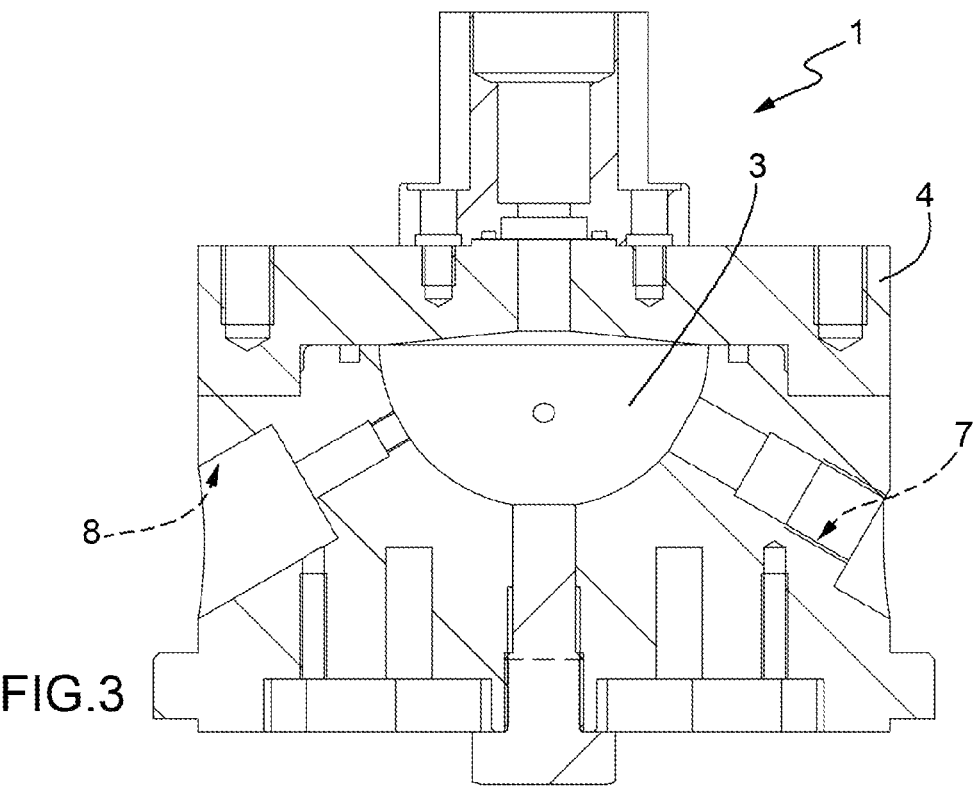
FIG. 3 is a second section of the detail in FIG. 2.

With reference to FIGS. 1, 2, and 3, numeral 1 indicates as a whole a measuring instrument for measuring the instantaneous flow of an injector 2 for gaseous fuels.

Instrument 1 comprises a measuring chamber 3 being substantially hemispherical in shape, which is obtained within a block 4 which is substantially parallelepiped in shape, is connected to the injector 2 for receiving a test gas, is further connected to the external environment in a continuous manner at a practically infinite volume by means of the interposition of a flow regulating valve 5 having a given outlet section $\sigma_s$, cooperates with a temperature sensor 6 adapted to measure the temperature of the test gas within chamber 3, and further cooperates with two pressure sensors 7, 8 adapted to measure the pressure of the test gas within chamber 3 according to modes which will be disclosed in greater detail below.

Instrument 1 further comprises a calculation device 9 connected to sensors 6, 7, and 8 for calculating the instantaneous flow of injector 2 according to modes which will be disclosed in greater detail below.

According to a variant (not shown), instrument 1 further comprises a temperature sensor and a pressure sensor adapted to measure the temperature and pressure of the test gas fed to the injector 2, and a mass meter mounted at the outlet of chamber 3 downstream of valve 5 for measuring the overall test gas mass injected by injector 2 into chamber 3 in a given time range and comparing the measured value with the value calculated by the device 9.

Figure 4:
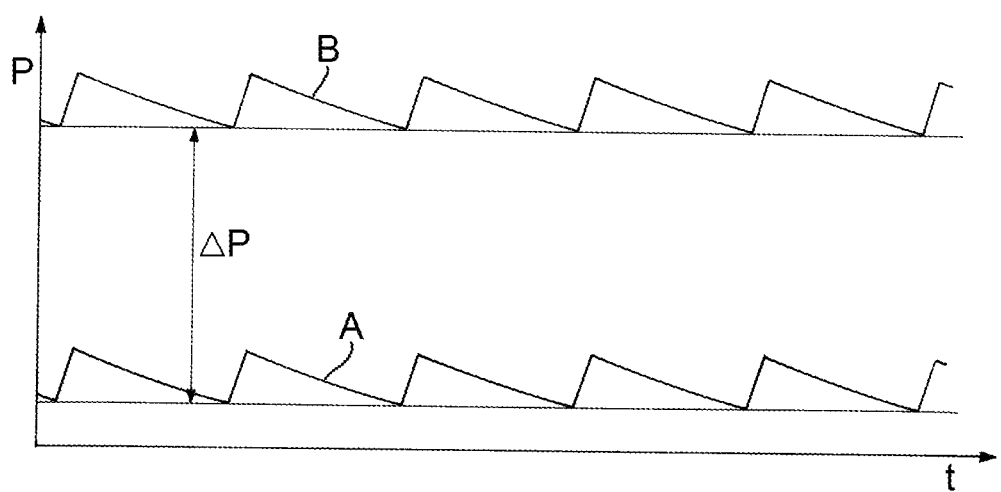
FIG. 4 is a graph related to the operation of a second detail of the measuring instrument in FIG. 1.

Sensor 7 is a sensor of the piezoelectric type adapted to measure a variation of the test gas pressure about an average value, as shown by curve A in the graph of FIG. 4, and sensor 8 is a sensor of the piezoresistive type adapted to measure an absolute pressure of the test gas within chamber 3, as shown by curve B in the graph of FIG. 4.

In use, once a reference value of the test gas pressure variation supplied by sensor 7 (a minimum value in this case, shown in FIG. 4) and a reference value of the absolute test gas pressure supplied by sensor 8 (a minimum value in this case, shown in FIG. 4) have been determined, the test gas pressure is determined by adding the difference $\Delta P$ between the two reference values to the test gas pressure variation supplied by sensor 7.

The combination of the two sensors 7 and 8 and the possibility of selectively controlling the operating range of sensor 7 allow to measure the test gas pressure within chamber 3 with the maximum accuracy, because possible background noises, deriving from electronic apparatuses outside instrument 1 or being intrinsic to the instrument 1 itself, affect the signal acquired by sensor 7 to a lesser extent than they affect the signal acquired by sensor 8.

Obviously, the reference values used may also be the average values or the maximum values of the test gas pressure variation supplied by sensor 7 and of the absolute test gas pressure supplied by sensor 8.

Figure 6:
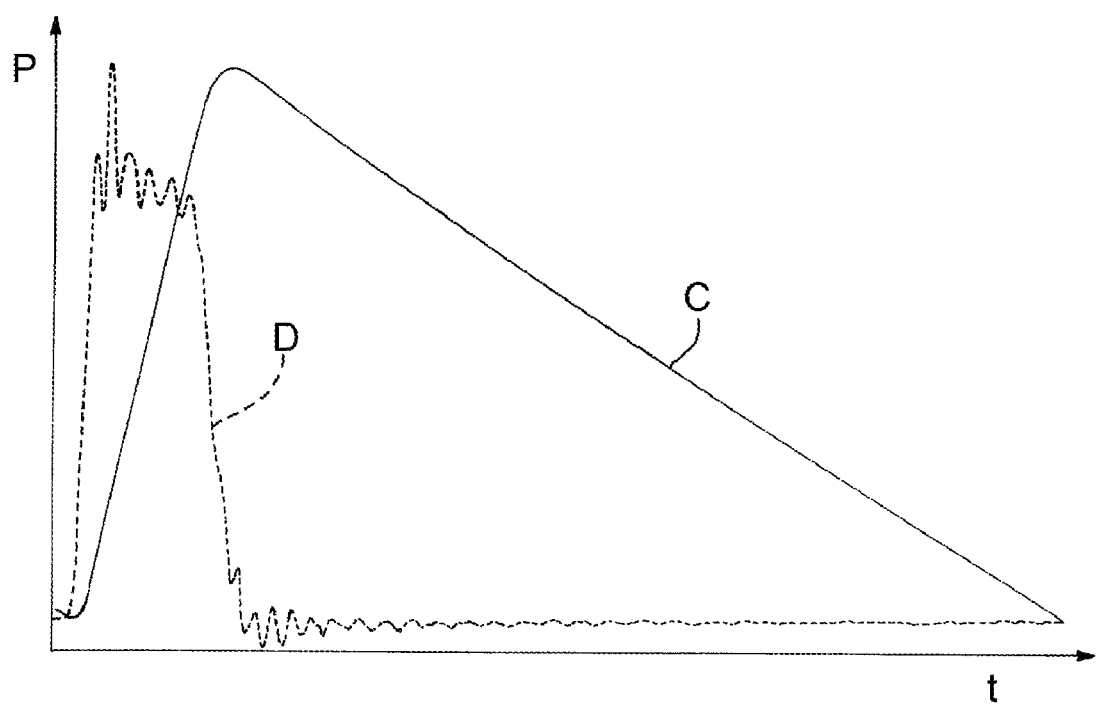
FIGS. 5 and 6 are two graphs related to the operation of the measuring instrument in FIG. 1.
Figure 5:
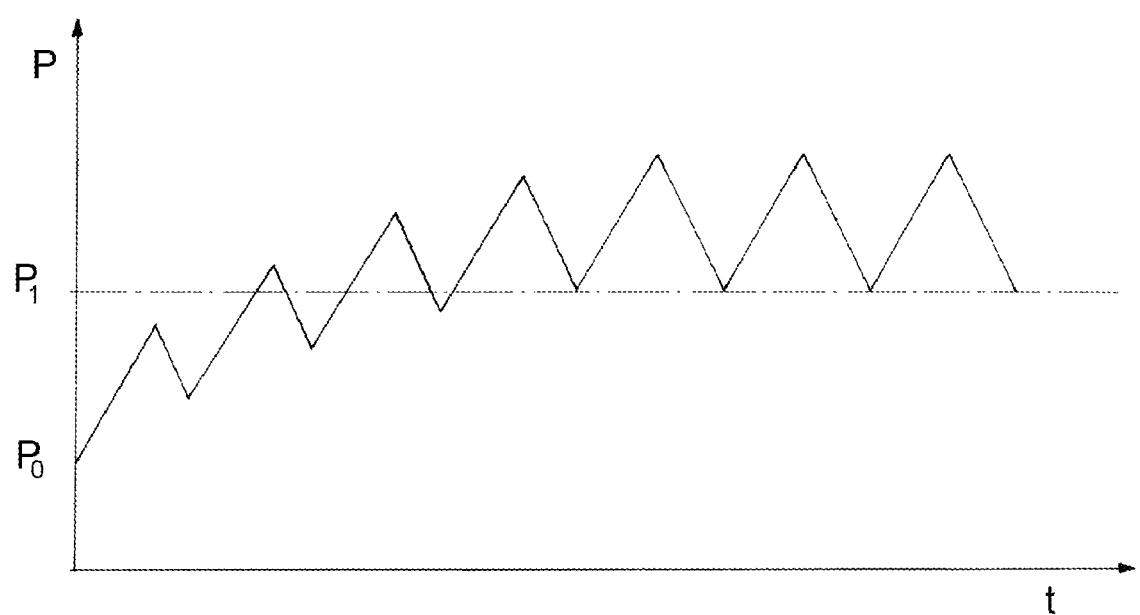

The operation of instrument 1 will now be shown with reference to FIGS. 5 and 6 and from when the pressure inside the chamber 3, connected to the external environment in a continuous manner through the outlet section $\sigma_s$, is substantially equal to an initial value $P_0$ corresponding to the external environment pressure.

The pattern of the test gas pressure within chamber 3 during the initial cycles of the injector 2 is depicted in FIG. 5, which shows how the pressure increases upon the injection of test gas into the chamber 3 and decreases when the injector 2 is closed upon the release of test gas through the outlet section $\sigma_s$.

As the pressure inside the chamber 3 is not sufficient to relieve outside chamber 3 all the test gas injected into the chamber 3 itself, the final pressure at the end of each initial cycle of the injector 2 is higher than the corresponding initial pressure. The difference between the final pressure and the initial pressure of the initial cycles of the injector 2 gradually decreases to zero when the pressure inside the chamber 3 is substantially equal to a rating value $P_1$ at which all the test gas injected by the injector 2 into chamber 3 is relieved outside the chamber 3 itself when closing the injector 2.

With regard to the above, it is worth noting that the outlet section $\sigma_s$ is selectively controlled to set the rating value $P_1$ and so that the ratio between the values $P_1$ and $P_0$ is at least equal to a limit value for which the speed of the test gas at the outlet section $\sigma_s$ is substantially equal to the sound propagation speed and, thus, the test gas flow through the outlet section $\sigma_s$ itself is independent of a variation of the pressure in the external environment.

Similarly, the value of the feeding test gas pressure through the outlet section of injector 2 and the value $P_1$ may be selectively controlled so that their ratio is at least equal to a limit value for which the test gas speed at the outlet section of the injector 2 is substantially equal to the sound propagation speed and, thus, the test gas flow through the outlet section of the injector 2 is independent of a variation of value $P_1$.

Once the rating value $P_1$ has been achieved, instrument 1 calculates the instantaneous flow of injector 2.

The test gas pressure and temperature in chamber 3 are not perfectly homogenous due to the rapidity of the phenomenon under examination (a few msec). For example, it may be easily expected that the value of the pressure close to the injector 2 is higher than the value of the pressure at points of chamber 3 which are more distant from the injector 2 itself.

However, we have chosen to assume that the pressure and temperature of the test gas in chamber 3 are homogenous so as to be able to use simpler equations for modeling the behaviour of the physical system, although such a simplifying assumption may introduce a potential error when measuring the instantaneous flow of the injector 2. By virtue of such a simplifying assumption, the instantaneous flow of the injector 2 is calculated from the equation of the mass balance within the volume delimited by chamber 3 between the outlet section of the injector 2 and the outlet section $\sigma_s$ of the valve 5:

$$\dot{m}_{in} = \frac{dM}{dt} + \dot{m}_u \qquad [1]$$

where $\dot{m}_{in}$ and $\dot{m}_u$ are the mass flow entering and exiting the chamber 3, respectively, and $$\frac{dM}{dt}$$

is the test gas mass variation within the chamber 3 itself.

As $$M = \rho \cdot V$$

where V is the constant volume of chamber 3 and $\rho$ is the test gas density and $$\rho = \frac{p}{R \cdot T}$$

where p is the pressure, R is the specific constant, and T is the test gas temperature it results that $$\frac{dM}{dt} = V \frac{d}{dt}\left(\frac{p}{RT}\right) \qquad [2]$$

The mass flow at the outlet of chamber 3 is equal to $$\dot{m}_u = \rho \cdot v \cdot \sigma_s$$

where $\rho$ is the test gas density and v is the speed of the test gas at the outlet section $\sigma_s$.

By applying the theory of unidimensional motion of isentropic flows within converging-diverging pipes, it results that $$\rho \cdot v = \frac{p}{\sqrt{RT}} \sqrt{k\left(\frac{2}{k+1}\right)^{\frac{k+1}{k-1}}} \qquad [3]$$

where p is the pressure, R is the specific constant, k is the ratio of specific heats, and T is the test gas temperature.

Therefore, it results that $$\dot{m}_{in} = V \frac{d}{dt}\left(\frac{p}{RT}\right) + \sigma_s \frac{p}{\sqrt{RT}} \sqrt{k\left(\frac{2}{k+1}\right)^{\frac{k+1}{k-1}}} \qquad [4]$$

As the thermal insulation of chamber 3 is not total, there is an inevitable continuous heat exchange with the external environment.

However, we have chosen to assume that the test gas is injected into chamber 3 under adiabatic conditions so as to be able to use simpler equations for modeling the behaviour of the physical system, although such a simplifying assumption may introduce a potential error when measuring the instantaneous flow of the injector 2.

By virtue of such a simplifying assumption, the condition of adiabaticness is considered $$\frac{dT}{T} = \frac{k-1}{k} \frac{dp}{p} \qquad [5]$$

which may be firstly transformed into $$\frac{T}{dt} \frac{dT}{T} = \frac{k-1}{k} \frac{dp}{p} \frac{T}{dt}$$

and then into $$\frac{dT}{dt} = \frac{T}{p} \frac{k-1}{k} \frac{dp}{dt}$$

Therefore, being $$\frac{d}{dt}\left(\frac{p}{T}\right) = \frac{\frac{dp}{dt}T - \frac{dT}{dt}p}{T^2} \qquad [6]$$

it results that $$\frac{d}{dt}\left(\frac{p}{T}\right) = \frac{\frac{dp}{dt}T - \frac{k-1}{k}\frac{dp}{dt}\frac{T}{p}p}{T^2}$$

$$= \frac{1}{T}\left(\frac{dp}{dt} - \frac{k-1}{k}\frac{dp}{dt}\right)$$

$$= \frac{1}{T}\frac{dp}{dt}\left(1 - \frac{k-1}{k}\right)$$

$$= \frac{dp}{dt}\frac{1}{kT}$$

The mass flow entering chamber 3 thus becomes $$\dot{m}_{in} = \frac{V}{R \cdot k \cdot T}\frac{dp}{dt} + \sigma_s \frac{p}{\sqrt{RT}}\sqrt{k\left(\frac{2}{k+1}\right)^{\frac{k+1}{k-1}}} \quad [7]$$

and is further transformed into $$\dot{m}_{in} = C_1 \frac{dp}{dt} + C_2 p$$

where:

$$C_1 = \frac{V}{R \cdot k \cdot T} \quad [8]$$

and $$C_2 = \sigma_s \frac{1}{\sqrt{RT}}\sqrt{k\left(\frac{2}{k+1}\right)^{\frac{k+1}{k-1}}} \quad [9]$$

The first factor $C_1$ is known because it is a function of the volume of chamber 3 and of the features and temperature of the test gas used. The second factor $C_2$ is calculated during the period of closure of the injector when the instantaneous flow of the injector $\dot{m}_{in}$ is zero.

The calculation method and the use of the two sensors 7 and 8 allow to accurately measure the pressure of the test gas within chamber 3 (represented by curve C of the graph shown in FIG. 6) and to accurately calculate the instantaneous flow of the injector 2 (represented by curve D in the graph shown in FIG. 6).

As previously mentioned, in order to define equation [7] providing the mass flow entering the chamber 3, there are two simplifying assumptions (homogeneousness of the gas in chamber 3 and conditions adiabaticness of) which do not exactly correspond to physical reality, and thus may potentially introduce theoretically even very important errors into the measurement of the mass flow entering chamber 3.

In order to verify the entity of the errors introduced by using equation [7] into the measurement of the mass flow entering chamber 3, a sample injector 2 having calibrated features known a priori was used to develop, on one hand, a more complete, more complex model (based on numeric calculation techniques) which does not use these simplifying assumptions (and which, inter alia, also takes instantaneous variations of the gas temperature in chamber 3 into account) and to make, on the other hand, a series of experimental measurements of the mass flow of the sample injector 2.

Surprisingly, the measurement of mass flow entering chamber 3 carried out by using equation [7] (i.e. using a simplified, imperfect physical reality model) was more accurate than the measurement of mass flow entering chamber 3 carried out by using an equation deriving from the complete model; furthermore, the measurement of the mass flow entering chamber 3 carried out by using equation [7] was found to be extremely accurate and displayed an average error which was much lower than expected. Such a result is due to that, on one hand, the simplified model avoids the use of physical measurements (such as the instantaneous variations of the gas temperature in chamber 3), the accuracy of which is modest due to the technological limitations of current sensors, and, on the other hand, the simplifying assumptions could introduce errors of opposite sign which tend to be compensated in the final measurement.

Attempts have been also made to develop other simplified models of the behaviour of gas inside the chamber 3 using simplifying assumptions other than those suggested above; however, none of the other simplified models allowed to obtain an equation for calculating the mass flow entering chamber 3 having an accuracy being either better than or comparable to the accuracy obtained using the equation [7].

The invention claimed is:

1. A method for measuring the instantaneous flow of an injector for gaseous fuels, the method comprising the steps of:
    injecting a test gas inside a measuring chamber connected to an external environment in a continuous manner via an outlet having a given first outlet section ($\sigma_s$),
    measuring a pressure of the test gas inside the measuring chamber during at least one injection cycle of the injector,
    measuring a temperature of the test gas inside the measuring chamber during said injection cycle, and
    calculating the instantaneous flow of the injector as a function of the measured pressure and temperature values, and being characterized in that it further comprises the step of:
    calculating the instantaneous flow of the injector using the formula $$\dot{m}_{in} = C_1 \frac{dp}{dt} + C_2 p$$

where:
$\dot{m}_{in}$ is the instantaneous flow of the injector;
$C_1$ is a first factor function of a volume of the measuring chamber and of the measured temperature, calculated using the formula $$C_1 = \frac{V}{R \cdot k \cdot T}$$

where:
V is the volume of the measuring chamber,
R is the specific constant of the test gas,
k is a ratio of the specific heats of the test gas,
T is the temperature of the test gas inside the measuring chamber
p is the measured pressure, and
$C_2$ is a second factor function of the measured temperature and of the first outlet section ($\sigma_s$) calculated using the formula $$C_2 = \sigma_s \frac{1}{\sqrt{R \cdot T}}\sqrt{k\left(\frac{2}{k+1}\right)^{\frac{k+1}{k-1}}}.$$

2. The method according to claim 1 and further comprising the step of calculating the second factor $C_2$ during a period of closure of the injector when the instantaneous flow $\dot{m}_{in}$ of the injector is null.

3. The method according to claim 1 and additionally comprising the steps of: injecting the test gas inside the measuring chamber starting from a moment in which the pressure inside the measuring chamber is substantially equal to a first value corresponding to the pressure in the environment outside the same measuring chamber, and selectively controlling the first outlet section ($\sigma_s$) to reach a pressure inside the measuring chamber equal to a second value such that the initial and final values of the pressure at the beginning and end of each injection cycle are substantially the same and equal to the second value.

4. The method according to claim 3 and further comprising the step of: selectively controlling the first outlet section ($\sigma_s$) so that a ratio between the said second value and first value is at least equal to a limit value for which the flow of the test gas through the first outlet section ($\sigma_s$) is independent of a variation in said first value.

5. The method according to claim 4 and further comprising the step of: selectively controlling the first outlet section ($\sigma_s$) so that the ratio between the said second value and first value is such that the speed of the test gas in correspondence to the first outlet section ($\sigma_s$) is substantially equal to the speed of sound propagation.

6. The method according to claim 3 and additionally comprising the steps of: feeding the test gas through a second outlet section of the injector with a feed pressure substantially equal to a given third value, selectively controlling the feed pressure of the test gas so that the ratio between the said third value and second value is at least equal to a limit value for which the flow of the test gas through the second outlet section is independent of a variation in the second value.

7. The method according to claim 6 and further comprising the step of:
    selectively controlling the feed pressure of the test gas so that the ratio between the said third value and second value is such that the speed of the test gas in correspondence to the second outlet section is substantially equal to the speed of sound propagation.

8. The method according to claim 1, in which the step of measuring the pressure of the test gas inside the measuring chamber comprises the additional steps of: measuring a change in the measured pressure of the test gas around an average value by means of a first pressure sensor associated with the measuring chamber, measuring an absolute pressure of the test gas by means of a second pressure sensor associated with the measuring chamber, and determining the pressure of the test gas by adding the absolute pressure of the test gas provided by the second pressure sensor to the change of pressure of the test gas provided by the first pressure sensor.

9. The method according to claim 8 and comprising the additional steps of: determining a first reference value of the change in pressure of the test gas provided by the first pressure sensor, determining a second reference value of the absolute pressure of the test gas provided by the second pressure sensor, and determining the pressure of the test gas by adding the difference between the second reference value and the first reference value to the change in pressure of the test gas provided by the first pressure sensor.

10. The method according to claim 9, in which the reference value is selected from the group consisting of: minimum, average, and maximum value.

11. The method according to claim 8, in which the first pressure sensor is of the piezoelectric type and the second pressure sensor is of a piezoresistive type.

12. The method according to claim 1, in which the measuring chamber has a substantially hemispherical shape.

13. The method according to claim 1, in which the measuring chamber has a constant volume.

14. A method for measuring the instantaneous flow of an injector for gaseous fuels, the method comprising the steps of:
    injecting a test gas inside a measuring chamber connected to the external environment in a continuous manner via an outlet having a given first outlet section ($\sigma_s$), determining the pressure of the test gas inside the measuring chamber during at least one injection cycle of the injector, measuring the temperature of the test gas inside the measuring chamber during said injection cycle, and
    calculating the instantaneous flow of the injector as a function of the measured pressure and temperature values, and being characterized in that it further comprises the step of:
    calculating the instantaneous flow of the injector using the formula $$\dot{m}_{in} = C_1 \frac{dp}{dt} + C_2 p$$

where:
$\dot{m}_{in}$ is the instantaneous flow of the injector;
$C_1$ is a first factor function of a volume of the measuring chamber and of the measured temperature,
p is the measured pressure, and
$C_2$ is a second factor function of the measured temperature and of the first outlet section ($\sigma_s$);
wherein determining the pressure of the test gas inside the measuring chamber comprises the additional steps of: measuring a change in the pressure of the test gas around an average value by means of a first pressure sensor associated with the measuring chamber, measuring an absolute pressure of the test gas by means of a second pressure sensor associated with the measuring chamber, and determining the pressure of the test gas by adding the absolute pressure of the test gas provided by the second pressure sensor to the change of pressure of the test gas provided by the first pressure sensor.

* * * * *